US010920731B2

(12) United States Patent
Bang et al.

(10) Patent No.: US 10,920,731 B2
(45) Date of Patent: Feb. 16, 2021

(54) METHOD AND DEVICE FOR CONTROLLING VEHICLE INCLUDING IDLE STOP AND GO FUNCTION

(71) Applicants: HYUNDAI MOTOR COMPANY, Seoul (KR); KIA MOTORS CORPORATION, Seoul (KR)

(72) Inventors: Jung Hwan Bang, Hwaseong-si (KR); Young Ho Jung, Seoul (KR); Tae Suk Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/012,075

(22) Filed: Jun. 19, 2018

(65) Prior Publication Data
US 2019/0186450 A1 Jun. 20, 2019

(30) Foreign Application Priority Data

Dec. 18, 2017 (KR) .................. 10-2017-0174558

(51) Int. Cl.
*F02N 11/08* (2006.01)
*B60W 30/18* (2012.01)
(Continued)

(52) U.S. Cl.
CPC ... *F02N 11/0818* (2013.01); *B60W 30/18018* (2013.01); *F02D 41/0225* (2013.01);
(Continued)

(58) Field of Classification Search
CPC ............ F02N 11/0818; F02N 11/0822; F02N 11/0814; F02N 2200/024; F02N 2200/102;
(Continued)

(56) References Cited

U.S. PATENT DOCUMENTS 8,401,768 B2 * 3/2013 Lewis ................... F02D 41/062 701/112
2010/0242905 A1 * 9/2010 Machida ............. F02N 11/0844 123/339.14
(Continued)

FOREIGN PATENT DOCUMENTS

DE 19911736 A1 9/1999
DE 102010034554 A1 3/2011
(Continued)

OTHER PUBLICATIONS

European search report dated Dec. 19, 2018 from the corresponding European Application No. 18182393.1, 10 pp.

*Primary Examiner* — George C Jin
(74) *Attorney, Agent, or Firm* — Brinks Gilson & Lione

(57) ABSTRACT

A method for controlling a vehicle includes: receiving a detection signal to perform an idle stop and go (ISG) function; and controlling the vehicle to enter into an ISG state where a fuel supply to an engine is cut off and the engine stops when the vehicle decelerates or stops in response to the detection signal. The detection signal includes a fuel cut off signal that is in on state when the vehicle decelerates and in off state at a reference revolution per minute (RPM) of the engine, a gear engagement signal, and a brake pedal signal indicating whether the brake pedal of the vehicle is operated. A controller of the vehicle generates an ISG entry signal based on the fuel cut off signal, the gear engagement signal, and the brake pedal signal to enter the vehicle into the ISG state.

8 Claims, 3 Drawing Sheets

(51) Int. Cl.
*F02D 41/12* (2006.01)
*F02D 41/02* (2006.01)
*F02D 41/04* (2006.01)

(52) U.S. Cl.
CPC ........ *F02D 41/123* (2013.01); *F02N 11/0822* (2013.01); *B60W 2030/18081* (2013.01); *F02D 41/042* (2013.01); *F02N 2200/022* (2013.01); *F02N 2200/024* (2013.01); *F02N 2200/0801* (2013.01); *F02N 2200/0802* (2013.01); *F02N 2200/102* (2013.01)

(58) Field of Classification Search
CPC ..... F02N 2200/0802; F02N 2200/0801; F02N 2200/022; F02N 5/04; F02D 41/0225; F02D 41/123; F02D 41/042; F02D 41/062; B60W 30/18018; B60W 2030/18081; B60W 10/06; B60W 10/11; B60W 10/02
See application file for complete search history.

(56) References Cited

U.S. PATENT DOCUMENTS

| | | |
|---|---|---|
| 2011/0054765 A1 | 3/2011 | Lewis et al. |
| 2015/0158480 A1 | 6/2015 | Rademacher et al. |
| 2015/0167614 A1* | 6/2015 | Malone ............... F02N 11/0822 701/54 |
| 2015/0361910 A1 | 12/2015 | Ko et al. |
| 2016/0229391 A1* | 8/2016 | Shigemoto ............... B60K 6/48 |
| 2016/0273505 A1* | 9/2016 | Kojima ................. F02D 41/009 |
| 2019/0186451 A1* | 6/2019 | Bang ................... F02N 11/0833 |

FOREIGN PATENT DOCUMENTS

| | | |
|---|---|---|
| EP | 2789833 A1 | 10/2014 |
| EP | 2789834 A1 | 10/2014 |
| KR | 10-2008-0035099 A | 4/2008 |
| KR | 10-1576371 B1 | 12/2015 |

* cited by examiner

METHOD AND DEVICE FOR CONTROLLING VEHICLE INCLUDING IDLE STOP AND GO FUNCTION

CROSS-REFERENCE TO RELATED APPLICATION

This application claims priority to and the benefit of Korean Patent Application No. 10-2017-0174558, filed on Dec. 18, 2017, which is incorporated herein by reference in its entirety.

FIELD

The present disclosure relates to a method for controlling a vehicle, and more particularly, to a method and a device for controlling a vehicle including an idle stop and go function.

BACKGROUND

The statements in this section merely provide background information related to the present disclosure and may not constitute prior art.

Efforts have been being made to reduce carbon dioxide generated by combustion of a fuel in a vehicle all over the world and to improve fuel efficiency of the vehicle as oil prices increase.

An idle stop and go (ISG) system has been developed to meet the efforts. It has been proven that the ISG system can reduce an amount of carbon dioxide generated in the vehicle and can improve fuel efficiency.

The ISG system is an engine control system that stops an engine of the vehicle to inhibit or prevent the engine from operating when the vehicle decelerates or stops and drives the engine again to enable the vehicle to move when the vehicle starts.

The ISG system uses information such as the vehicle speed, the engine speed, and the engine coolant temperature to stop the engine when the engine is idling. In other words, the ISG system automatically stops the engine idling when the vehicle decelerates or stops due to a traffic signal and restarts the engine to start the vehicle after a predetermined time. The ISG system may also be named as an idling stop control device. The ISG system can achieve fuel economy of about 5 to 15% in a fuel economy mode. The vehicle equipped with the ISG system is referred to as an ISG vehicle.

Because the ISG system inhibits or prevents the engine from operating when the vehicle decelerates or stops, the fuel cannot be used. Thus, the fuel efficiency of the vehicle can be improved and the carbon dioxide is less discharged.

The ISG system includes a method of starting the engine using an electric motor and a method of starting the engine using a hydraulic motor. A passenger car can use the method of starting the engine using the electric motor.

The above information disclosed in this Background section is only for enhancement of understanding of the background of the present disclosure, and therefore it may contain information that does not form the prior art that is already known to a person of ordinary skill in the art.

SUMMARY

The present disclosure provides a method and a device for controlling a vehicle including an idle stop and go function which are capable of maintaining a fuel cut off state until the vehicle stops after cutting off a fuel supply to an engine when the vehicle decelerates.

In an exemplary form of the present disclosure, a method for controlling the vehicle having the idle stop and go function may include: receiving, by a controller, a detection signal to perform the idle stop and go function; and controlling, by the controller, the vehicle to enter into an idle stop and go state where a fuel supply to an engine of the vehicle is cut off and the engine stops when the vehicle decelerates or stops according to the idle stop and go function, in response to the detection signal. The detection signal may include a fuel cut off signal, a gear engagement signal, and a brake pedal signal. The fuel cut off signal is in an on state when the vehicle decelerates, is in an off state at a reference revolutions per minute (RPM) of the engine. The fuel cut off signal indicates whether a fuel supply to the engine is cut off, the gear engagement signal indicates whether a gear included in a transmission of the vehicle is engaged, and the brake pedal signal indicates whether the brake pedal of the vehicle is operated.

The controller may be configured to generate an idle stop and go entry signal based on the fuel cut off signal that is in a state before transitioning from an on state to an off state, the gear engagement signal that is in an on state, and the brake pedal signal that is in an on state, and the controller is configured to enter the vehicle into the idle stop and go state based on the idle stop and go entry signal.

The reference RPM of the engine may be greater than an idle RPM of the engine and may have a value close to the idle RPM.

The gear of the transmission may be in an engagement state when the fuel cut off signal is in the on state.

The method for controlling the vehicle including the idle stop and go function may further include: determining, by the controller, whether the brake pedal signal is switched from the on state to an off state. The controller may be configured to release the idle stop and go state when the brake pedal signal is switched to the off state The transmission may include an automatic transmission.

Another exemplary form of the present disclosure may provide the device for controlling the vehicle including the idle stop and go function, the device may include: a starter-generator configured to drive an engine of the vehicle; and a controller configured to receive a detection signal to perform the idle stop and go function. The controller may be configured to control the vehicle to enter into an idle stop and go state in response to the detection signal where a fuel supply to the engine of the vehicle is cut off and the engine stops when the vehicle decelerates or stops according to the idle stop and go function, and the controller is configured to operate the starter-generator when the idle stop and go state is released. The detection signal may include includes a fuel cut off signal, a gear engagement signal, and a brake pedal signal. The fuel cut off signal, which is in an on state when the vehicle decelerates, is in an off state at a reference revolution number of the engine (e.g., a reference revolutions per minute (RPM)), indicates whether a fuel supply to the engine is cut off. The gear engagement signal indicates whether a gear included in a transmission of the vehicle is engaged, and the brake pedal signal indicates whether the brake pedal of the vehicle is operated. The controller may be configured to generate an idle stop and go entry signal based on the fuel cut off signal that is in a state before transitioning from an on state to an off state, the gear engagement signal that is in an on state, and the brake pedal signal that is in an on state, and is configured to enter the vehicle into the idle stop and go state based on the idle stop and go entry signal.

The reference RPM of the engine may be greater than an idle RPM of the engine and may have a value close to the idle revolutions per minute.

The gear of the transmission may be in an engagement state when the fuel cut off signal is in an on state.

The controller may be configured to determine whether the brake pedal signal is switched from the on state to an off state and may be configured to release the idle stop and go state when the brake pedal signal is switched to the off state.

The method and the device for controlling the vehicle including the idle stop and go function according to the exemplary form of the present disclosure may enter the vehicle into the idle stop and go (ISG) state based on the idle stop and go (ISG) entry signal that is activated after the brake pedal is depressed in a state where the gear of the transmission is engaged after fuel cut by deceleration of the vehicle. Therefore, deterioration of the vehicle operability may be avoided or prevented even though a fuel injection into the engine is prohibited in an idle state of the engine due to entry of the ISG state. The deterioration of the vehicle operability may include deterioration of deceleration feeling of the vehicle driver that occurs due to increase of the engine friction torque caused by the fuel injection prohibition.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
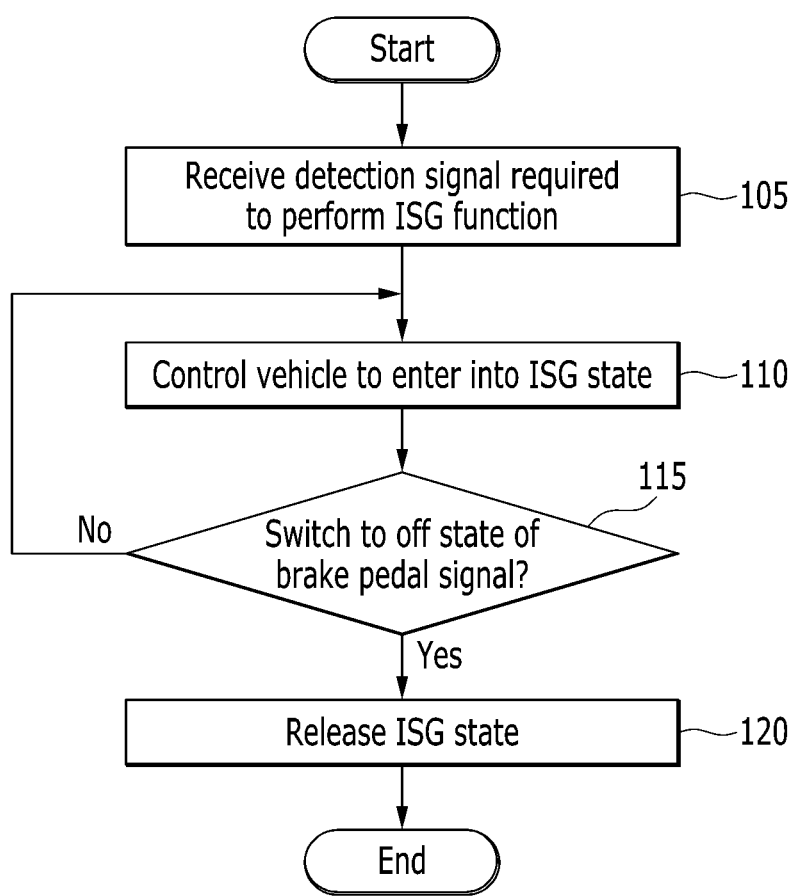
FIG. 1 is a flowchart illustrating a method for controlling a vehicle including an idle stop and go (ISG) function.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing the present disclosure, well-known configurations or functions will not be described in detail since they may unnecessarily obscure the gist of the present disclosure. Throughout the accompanying drawings, the same reference numerals will be used to denote the same components.

Terms used in the present specification are only used in order to describe specific exemplary forms rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

According to a related art, when a fuel cut signal for cutting off a fuel supplied to an engine is in an off state at a time of deceleration of a vehicle, the vehicle may enter into an idle stop & go (ISG) state only by depressing a brake pedal. Therefore, a fuel injection into the engine may be inhibited in an idle state of the engine by entry of the ISG state. As a result, an increase in the engine friction torque due to the fuel injection prohibition may result in deterioration of the vehicle driving performance such as deterioration of deceleration feeling of the vehicle driver.

Figure 2:
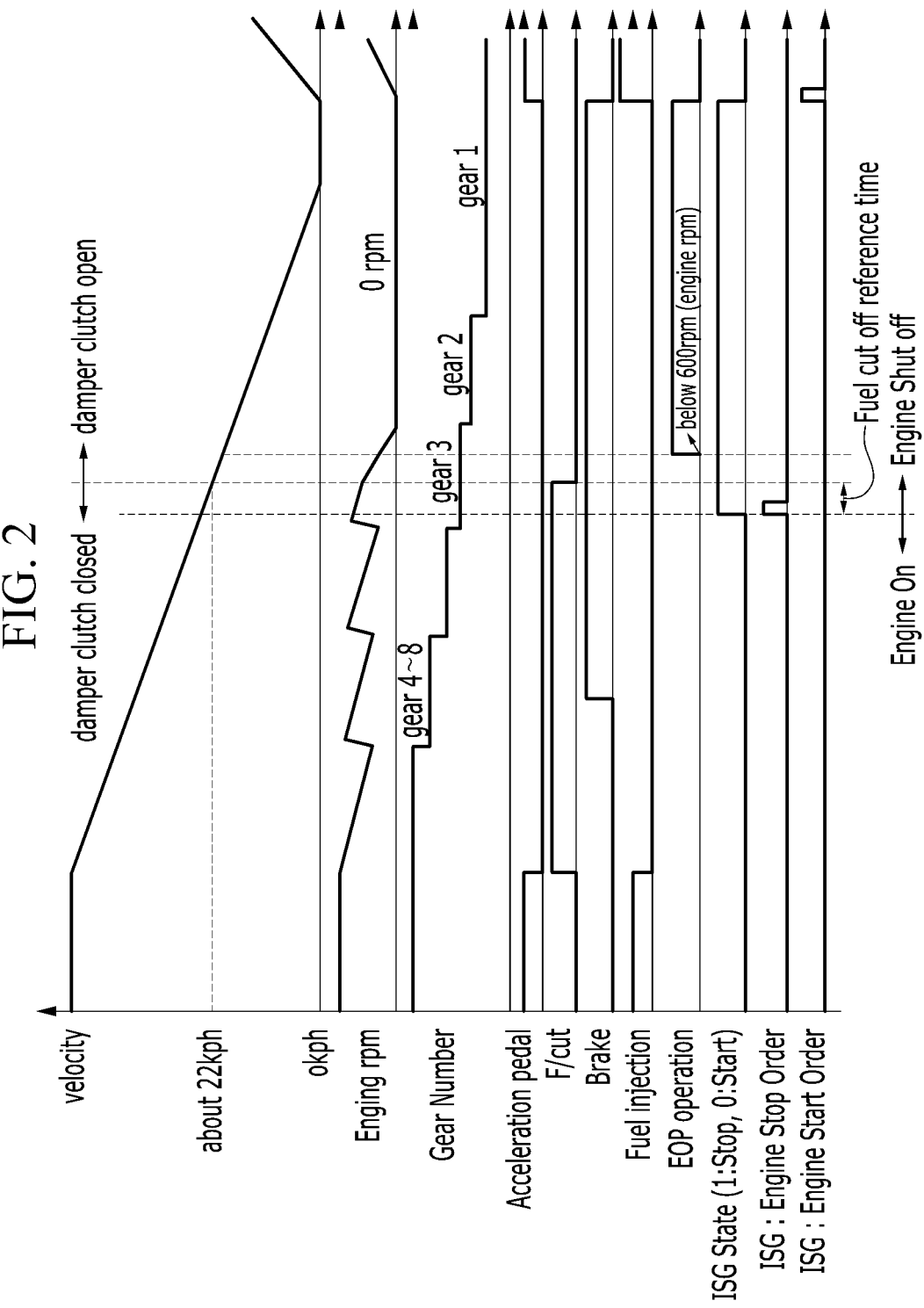
FIG. 2 is a view explaining the method for controlling the vehicle including the ISG function shown in FIG. 1.
Figure 3:
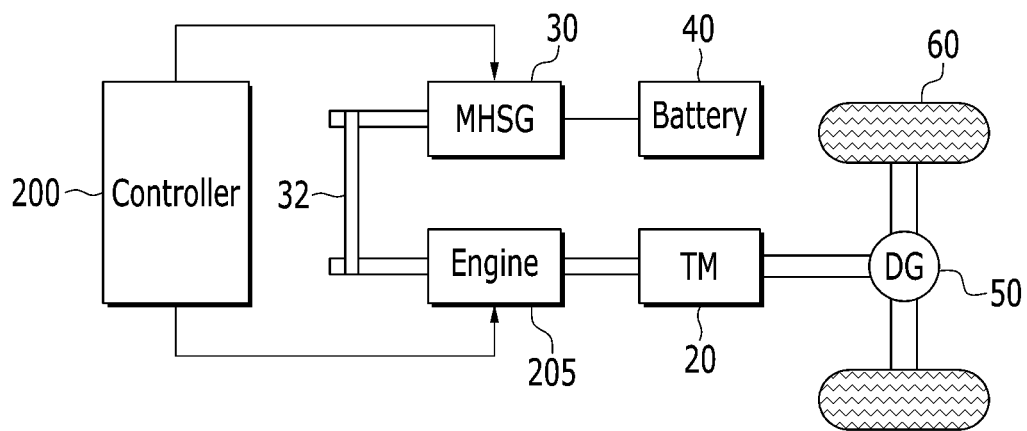
FIG. 3 is a block diagram illustrating an example of a vehicle to which the method for controlling the vehicle including the ISG function shown in FIG. 1 is applied.

FIG. 1 is a flowchart illustrating a method for controlling a vehicle including an idle stop and go (ISG) function in an exemplary form of the present disclosure. FIG. 2 is a view explaining the method for controlling the vehicle including the ISG function shown in FIG. 1. FIG. 3 is a block diagram illustrating an example of a vehicle to which the method for controlling the vehicle including the ISG function shown in FIG. 1 is applied.

Referring to FIG. 1 to FIG. 3, in a reception step 105, a controller 200 may receive a detection signal desired for performing the ISG function. The ISG function may mean a function that stops an engine 205 of the vehicle to inhibit or prevent the engine from operating when the vehicle decelerates or stops and drives the engine again to enable the vehicle to move when the vehicle starts. More specifically, the ISG function may automatically stop the engine 205 by preventing fuel injection into the engine when the vehicle decelerates or stops while the vehicle is running and automatically restart the engine by a starter-generator 30 when the vehicle is no longer in the decelerated or stopped state (e.g., when the driver of the vehicle releases a brake pedal and depresses an acceleration pedal).

The detection signal may include a fuel cut off signal that is in an on state when the vehicle is decelerated, is in an off state when revolutions per minute, namely RPM (or a revolution speed), of the engine 205 becomes a reference RPM of the engine. The detection signal may indicate whether a fuel supply to the engine is cut off, and also includes: a gear engagement signal indicating whether a gear of a transmission 20 of the vehicle is engaged, and a brake pedal signal indicating whether the brake pedal of the vehicle is operated. The reference RPM of the engine 205 may be greater than an idle RPM of the engine and may have a value (e.g., 1000 RPM) close to the idle RPM for maintaining the idle RPM and inhibiting or preventing the engine from turning off. The gear of the transmission 20 may be in an engagement state when the fuel cut off signal is in an on state. For example, the engagement state of the gear of the transmission 20 may mean a state where a damper clutch of a torque converter of an automatic transmission is engaged.

The fuel cut off signal may be used to improve fuel efficiency or fuel economy of the vehicle, to maintain the idle RPM of the engine 205, and to inhibit the engine from being turned off, when the vehicle decelerates. The fuel cut off signal may be generated by the controller 200 when the acceleration pedal of the vehicle is in an off state and the brake pedal is in an off state or the brake pedal is in an on state. When the fuel cut off signal is in an on state, an RPM of the engine 205 may be equal to or greater than a certain value (e.g., 1500 RPM or 2000 RPM).

The reference RPM of the engine 205 may be detected by a RPM sensor of the vehicle and the detected RPM may be provided to the controller 200. The gear engagement signal may be detected by a sensor that senses gear engagement installed in the vehicle and the detected signal may be provided to the controller 200. The brake pedal signal may be detected by a brake pedal sensor (BPS) of the vehicle and the detected signal may be provided to the controller 200. A state of the acceleration pedal may be detected by an acceleration pedal position sensor (APS) of the vehicle and the detected signal may be provided to the controller 200.

The controller 200 may control an overall operation of the vehicle. For example, the controller 200 such as an engine control unit (ECU) may be one or more microprocessors operated by a program or hardware including the microprocessor. The program may include a series of commands for executing the method for controlling the vehicle including the idle stop and go function according to the exemplary form of the present disclosure. The commands may be stored in a memory.

The vehicle may be, for example, a mild hybrid vehicle, and may include the engine 205, the transmission 20 such as the automatic transmission or a dual clutch transmission (DCT), the starter-generator (or the mild hybrid starter and generator) 30, a battery 40, a differential gear device 50, wheels 60, and the controller 200. The exemplary form of the present disclosure may be applied to a vehicle other than the mild hybrid vehicle shown in FIG. 3.

A device for controlling the vehicle including the Idle Stop and Go (ISG) function may include the starter-generator 30 and the controller 200.

The engine 205 may convert chemical energy to mechanical energy by burning fuel and air. Torque of the engine 205 may be transmitted to an input shaft of the transmission 20, and torque output from an output shaft of the transmission may be transmitted to an axle of the vehicle via the differential gear device 50. The axle may rotate the wheels 60 so that the mild hybrid vehicle may be driven.

The starter-generator 30 may convert electrical energy to mechanical energy or mechanical energy to electrical energy. In other words, the starter-generator 30 may start the engine 205 or generate electricity according to an output of the engine 205. In addition, the starter-generator 30 may assist the torque of the engine 205. The mild hybrid vehicle may use the torque of the starter-generator 30 as an auxiliary power while combustion torque of the engine 205 is a main power. The engine 205 and the starter-generator 30 may be connected via the belt 32 (or a pulley and a belt).

In the mild hybrid vehicle, the starter-generator 30 may be a part performing functions of an alternator, the engine torque assist, or regenerative braking.

The starter-generator 30 may drive the engine 205 of the vehicle in a cranking and torque control mode of the vehicle (or the engine) and may generate electricity according to an output of the engine to charge the 48 V battery 40 in an electricity generation mode of the vehicle. The starter-generator 30 may operate in an operating mode in accordance with a driving state of the vehicle. The operating mode may include an engine starting mode, an engine torque assist mode for assisting torque of the engine by operating as a motor, a mode for charging the 48 V battery charging the 12 V battery that is connected to the 48 V battery via the LDC, a regenerative braking mode for charging the 48 V battery, or an inertial driving mode for extending a mileage of the vehicle. The starter-generator 30 may be optimally controlled according to the driving state of the vehicle to increase fuel efficiency of the vehicle.

The battery 40 may supply electricity to the starter-generator 30 or may be charged by electricity collected through the starter-generator 30 in a regenerative braking mode of the vehicle. The battery 40 may be a 48 V battery. The mild hybrid vehicle may further include a low voltage DC-DC converter (LDC) that converts voltage supplied from the battery 40 to a low voltage and a 12 V battery that supplies the low voltage to an electric load of the vehicle.

According to a step 110, in response to the detection signal, the controller 200 may control the vehicle to enter into an idle stop and go (ISG) state where a fuel supply to the engine 205 of the vehicle is cut off and the engine stops when the vehicle decelerates or stops according to the ISG function of the controller. As shown in FIG. 2, the controller 200 may generate an idle stop and go (ISG) entry signal based on the fuel cut off signal "F/cut" that is in a state before transitioning from an on state to an off state, the gear engagement signal that is in an on state, and the brake pedal signal that is in an on state, and may enter the vehicle into the idle stop and go (ISG) state based on the idle stop and go (ISG) entry signal. An RPM of the engine 205 corresponding to the ISG entry signal may be greater than the reference revolution number of the engine and may be, for example, 1050 RPM. The ISG entry signal may be a signal that shuts down the engine 205 when the vehicle does not require acceleration.

An engine stop order signal in FIG. 2 may the ISG entry signal. A fuel injection into the engine may be prohibited when the engine stop order signal may be in an on state. When an engine start order signal is in an on state, the ISG state may be released so that a fuel injection into the engine 205 is performed and the engine is restarted by a starter motor (or the starter-generator 30). In the vehicle including the automatic transmission or the DCT, an RPM of the engine 205 may be maintained at an RPM greater than or equal to the idle RPM when the vehicle decelerates and a gear shift stage may be lowered to, for example, a fifth stage, a fourth stage, or a third three stage to improve the vehicle driving performance when the vehicle decelerates again. Accordingly, the RPM of the engine may decrease in accordance with a speed of the vehicle during deceleration of the vehicle and may increase during shifting.

When the fuel cut off signal F/cut is in an on state, the gear engagement signal is in an on state, and the brake pedal signal is in an on state, the vehicle may perform a coasting drive. An acceleration pedal signal indicating whether the acceleration pedal of the vehicle is operated may be in an off state before the coasting drive of the vehicle. The acceleration pedal signal may be detected by the acceleration pedal position sensor (APS) of the vehicle and the detected signal may be provided to the controller 200.

The vehicle speed (or the vehicle speed for fuel supply) corresponding to the reference RPM of the engine 205 may be, for example, 22 KPH. An operation time period of an electric oil pump (EOP) for operating the transmission 20 may be reduced when the vehicle speed for fuel supply is lowered. The gear included in the transmission 20 may be in a neutral state when the gear engagement signal is in an off state.

According to a determination step 115, the controller 200 may determine whether the brake pedal signal is switched from the on state to an off state.

According to a release step 120, the controller 200 may release the ISG state when the brake pedal signal is switched from the on state to the off state in the determination step 115.

The controller 200 may start the engine 205 of the vehicle by driving the starter-generator 30 in response to the acceleration pedal operation after the ISG state is released.

The components, "~ unit", block, or module which are used in the present exemplary form may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary forms have been disclosed in the accompanying drawings and the specification. Herein, specific terms have been used, but are just used for the purpose of describing the present disclosure and are not used for qualifying the meaning or limiting the scope of the present disclosure. Therefore, it will be understood by those skilled in the art that various modifications and equivalent exemplary forms are possible from the present disclosure.

DESCRIPTION OF SYMBOLS

30: MHSG
200: controller
205: engine

What is claimed is:

1. A method for controlling a vehicle including an idle stop and go function, comprising the steps of:
   receiving, by a controller, a detection signal to perform the idle stop and go function; and
   controlling, by the controller, the vehicle to enter into an idle stop and go state where a fuel supply to an engine of the vehicle is cut off and the engine stops when the vehicle decelerates or stops based on the idle stop and go function, in response to the detection signal,
   wherein:
      the detection signal includes a fuel cut off signal, a gear engagement signal, and a brake pedal signal,
      the fuel cut off signal is in an on state when the vehicle decelerates and is in an off state at a reference revolutions per minute (RPM) of the engine, and wherein the fuel cut off signal indicates whether the fuel supply to the engine is cut off, and wherein the gear engagement signal indicates whether a gear of a transmission of the vehicle is engaged, and wherein the brake pedal signal indicates whether a brake pedal of the vehicle is operated,
      the controller is configured to generate an idle stop and go entry signal before the fuel cut off signal is transitioned from an on state to an off state, and when the gear engagement signal is in an on state, and the brake pedal signal is in an on state,
      the controller is configured to enter the vehicle into the idle stop and go state based on the idle stop and go entry signal, and
      the reference RPM of the engine is greater than an idle RPM of the engine.

2. The method of claim 1, wherein the gear of the transmission is in an engagement state when the fuel cut off signal is in the on state.

3. The method of claim 1, further comprising:
   determining, by the controller, whether the brake pedal signal is switched from the on state to an off state,
   wherein the controller is configured to release the idle stop and go state when the brake pedal signal is switched to the off state.

4. The method of claim 1, wherein the transmission includes an automatic transmission.

5. A device for controlling a vehicle including an idle stop and go function, comprising:
   a starter-generator configured to drive an engine of the vehicle; and
   a controller configured to receive a detection signal to perform the idle stop and go function,
   wherein:
      the controller is configured to control the vehicle to enter into an idle stop and go state in response to the detection signal where a fuel supply to the engine is cut off and the engine stops when the vehicle decelerates or stops, and the controller is configured to operate the starter-generator when the idle stop and go state is released,
      the detection signal includes a fuel cut off signal, a gear engagement signal, and a brake pedal signal,
      the fuel cut off signal is in an on state when the vehicle decelerates, is in an off state at a reference revolutions per minute (RPM) of the engine, and wherein the fuel cut off signal indicates whether the fuel supply to the engine is cut off, and wherein the gear engagement signal indicates whether a gear of a transmission of the vehicle is engaged, and wherein a brake pedal signal indicates whether a brake pedal of the vehicle is operated,
      the controller is configured to generate an idle stop and go entry signal before the fuel cut off signal is transitioned from an on state to an off state, and when the gear engagement signal is in an on state, and the brake pedal signal is in an on state,
      the controller is configured to enter the vehicle into the idle stop and go state based on the idle stop and go entry signal, and
      the reference RPM of the engine is greater than an idle RPM of the engine and has a value close to the idle RPM.

6. The device of claim 5, wherein the gear of the transmission is in an engagement state when the fuel cut off signal is in the on state.

7. The device of claim 5, wherein the controller is configured to determine whether the brake pedal signal is switched from the on state to an off state, and
   wherein the controller is configured to release the idle stop and go state when the brake pedal signal is switched to the off state.

8. A method for controlling a vehicle including an idle stop and go function, comprising the steps of:
   generating, by a controller, an idle stop and go entry signal based on a detection signal;
   wherein:

the detection signal includes a fuel cut off signal, a gear engagement signal, and a brake pedal signal, the fuel cut off signal is in an on state when the vehicle decelerates and is in an off state at a reference revolutions per minute (RPM) of the engine, and wherein the fuel cut off signal indicates whether a fuel supply to the engine is cut off, and wherein the gear engagement signal indicates whether a gear of a transmission of the vehicle is engaged, and wherein the brake pedal signal indicates whether a brake pedal of the vehicle is operated, the controller is configured to generate the idle stop and go entry signal before the fuel cut off signal is transitioned from an on state to an off state based on the reference RPM of the engine, and when the gear engagement signal is in an on state, and when the brake pedal signal that is in an on state, and the reference RPM of the engine is greater than an idle RPM of the engine.

\* \* \* \* \*